(12) United States Patent
Chang et al.

(10) Patent No.: US 8,125,594 B2
(45) Date of Patent: Feb. 28, 2012

(54) PIXEL STRUCTURE OF A LIQUID CRYSTAL DISPLAY

(75) Inventors: Tsu Chiang Chang, Taipei (TW); Po Sheng Shih, Hsinchu (TW); Po Yang Chen, Tainan (TW); Chao Hui Wu, Taoyuan County (TW)

(73) Assignee: Hannstar Display Corp., Taipei (TW)

( * ) Notice: Subject to any disclaimer, the term of this patent is extended or adjusted under 35 U.S.C. 154(b) by 664 days.

(21) Appl. No.: 12/210,145

(22) Filed: Dec. 30, 2008

(65) Prior Publication Data

US 2010/0097546 A1   Apr. 22, 2010

(30) Foreign Application Priority Data

Jan. 31, 2008   (TW) ................................ 97103682 A

(51) Int. Cl.
   *G02F 1/1333*   (2006.01)
   *G02F 1/1335*   (2006.01)
(52) U.S. Cl. ........................................ 349/110; 349/106

(58) Field of Classification Search .................... None
See application file for complete search history.

(56) References Cited

U.S. PATENT DOCUMENTS

| | | | |
|---|---|---|---|
| 2002/0176030 A1* | 11/2002 | Matsumoto ..................... | 349/43 |
| 2004/0257500 A1* | 12/2004 | Kim et al. ..................... | 349/106 |
| 2006/0192900 A1* | 8/2006 | Tseng et al. .................. | 348/751 |
| 2006/0215071 A1* | 9/2006 | Shin et al. ..................... | 349/44 |
| 2007/0268423 A1* | 11/2007 | Yi et al. ......................... | 349/44 |
| 2008/0068537 A1* | 3/2008 | Lee et al. ...................... | 349/106 |
| 2008/0204613 A1* | 8/2008 | Kim et al. ...................... | 349/33 |

* cited by examiner

*Primary Examiner* — Tina Wong
(74) *Attorney, Agent, or Firm* — Lowe, Hauptman, Ham & Berner, LLP

(57) ABSTRACT

A pixel structure of a liquid crystal display includes a substrate, a light shielding element, a first data line, a second data line and a pixel electrode. The light shielding element is formed on the substrate. The first and second data lines are formed along the light shielding element, and the second data line overlaps with portions of the light shielding element. The pixel electrode overlaps with portions of the first data line and the light shielding element without overlapping with the second data line.

24 Claims, 12 Drawing Sheets

PIXEL STRUCTURE OF A LIQUID CRYSTAL DISPLAY

CROSS REFERENCE TO RELATED APPLICATION

This application claims the priority benefit of Taiwan Patent Application Serial Number 097103682, filed on Jan. 31, 2008, the full disclosure of which is incorporated herein by reference.

BACKGROUND OF THE INVENTION

1. Field of the Invention

This invention generally relates to a pixel structure of a liquid crystal display, and more particularly to a pixel structure of a liquid crystal display with high aperture ratio and low coupling ratio.

2. Description of the Related Art

Accompanying with the improvement of electronic technology, especially the popularity of portable electronic products in daily life, there is an increased demand for light, compact and low power consumption display devices. Because a liquid crystal display has the merits of low power consumption, compact and light, it is suitable for this kind of electronic products and even gradually replaces conventional cathode ray tube (CRT) devices.

Because the pixel aperture ratio is an important factor that has an effect on the characteristics of liquid crystal displays, several kinds of pixel structures have been proposed so far to increase the pixel aperture ratio. Referring to FIGS. 1 and 2, FIG. 1 shows a plane view of a conventional pixel structure with high aperture ratio while FIG. 2 shows a cross-sectional view taken along the line II-II' of FIG. 1. The pixel structure 9 includes a gate line 91 and a storage line 92 formed parallel in a row; a data line 93 perpendicular to the gate line 91 and the storage line 92, wherein the storage line 92 has a first part 92*a* serving as a common line and a second part 92*b* serving as a storage capacitor and the width of the second part 92*b* is larger than that of the first part 92*a*. The gate line 91 and the data line 93 define a pixel region.

A thin film transistor 95 is disposed adjacent to an intersection of the gate line 91 and the data line 93 and includes a gate electrode 91*a* extended from the gate line 91, a semiconductor layer 951 formed on the upper of the gate electrode 91*a* with sandwiching an insulating layer 98, as shown in FIG. 2. A source electrode 953 and a drain electrode 952 overlap with both side portions of the semiconductor layer 951, respectively. An organic insulating layer 97 is formed over the pixel region and a pixel electrode 96 is further stacked thereon. A contact hole 99 is provided through the organic insulating layer 97 so as to electrically connect the pixel electrode 96 to the source electrode 953, wherein the pixel electrode 96 overlaps with portions of the gate line 91 and the data line 93 respectively, thereby increasing the aperture ratio of the pixel structure 9.

However, in the above pixel structure 9, an organic insulating layer 97 is disposed to decrease the parasitic capacitance Cpd existed between the pixel electrode 96 and the data line 93 thereby reducing crosstalk. Referring to FIG. 3, it shows the connection between capacitors in a pixel region. With reference to this drawing, the coupling ratio in a single pixel region can be obtained as (Cpd1+Cpd2)/[(Cpd1+Cpd2)+Cst+Clc+(Cgs+Cpg)], where (Cpd1+Cpd2) is the parasitic capacitance induced by the overlapping of a pixel electrode with data lines of this pixel region, Cst is the storage capacitance of the pixel region, Clc is the capacitance of liquid crystal unit, Cgs is the parasitic capacitance between a gate electrode and a source electrode of the thin film transistor, Cpg is the capacitance between a pixel electrode and a gate electrode of the thin film transistor. If the coupling ratio in a single pixel region becomes smaller, the crosstalk becomes smaller. And according to the above equation, the coupling ratio can be reduced by decreasing the value of (Cpd1+Cpd2) or by increasing the value of Cst.

Although the parasitic capacitance Cpd between the pixel electrode 96 and the data line 93 can be reduced by disposing an organic insulating layer 97 in the pixel structure 9 as shown in FIGS. 1 and 2, the storage capacitance Cst between the pixel electrode 96 and the second part 92*b* of the storage line 92 will also be reduced simultaneously. Therefore, the coupling ratio in a single pixel region is not able to be effectively reduced.

Therefore, the present invention further provides a pixel structure of a liquid crystal display which can increase the aperture ratio of a pixel structure and reduce the coupling ratio in a single pixel region.

SUMMARY OF THE INVENTION

It is an object of the present invention to provide a pixel structure of a liquid crystal display, wherein the pixel electrode is formed to overlap with portions of the data line and the gate line so as to increase the aperture ratio of the pixel structure.

It is another object of the present invention to provide a pixel structure of a liquid crystal display, wherein the pixel electrode overlaps with portions of one of two data lines in a pixel region without overlapping with the other, such that the coupling ratio in a single pixel region can be effectively decreased thereby reducing crosstalk.

It is a further object of the present invention to provide a pixel structure of a liquid crystal display, wherein a transparent electrode is formed to overlap with the pixel electrode to increase the pixel storage capacitance thereby reducing the coupling ratio in a single pixel region.

It is a further object of the present invention to provide a pixel structure of a liquid crystal display, wherein the thickness of a passivation layer is increased so as to prevent the formation of additional organic insulating layer thereby reducing the manufacturing cost.

In order to achieve above objects, the present invention provides a pixel structure of a liquid crystal display including a substrate, a light shielding element, a metal layer including a first data line and a second data line, and a pixel electrode. The light shielding element is formed on the substrate. The first data line is formed along the light shielding element and overlaps with portions of the light shielding element; the second data line is substantially parallel to the first dada line. The pixel electrode overlaps with portions of the second data line and the light shielding element without overlapping the first data line.

The pixel structure of the present invention further includes a first insulating layer and a second insulating layer. The first insulating layer is formed between the metal layer and the light shielding layer. The second insulating layer is formed between the metal layer and the pixel electrode.

The pixel structure of the present invention further includes a conductive line, such as a gate line or a common line, crossing the first data line and the second data line and overlapping with portions of the pixel electrode. The conductive line can be electrically connected to or separated from the light shielding element. In addition, an overlapping portion of the conductive line and the pixel electrode is for forming the storage capacitance. It is able to further form a conductive layer between the conductive line and the pixel electrode, and the conductive layer is electrically connected to the pixel electrode through a contact hole.

The above pixel structure may further include a transparent electrode electrically connected to the conductive line. The transparent electrode is sandwiched between the substrate and the pixel electrode and is disposed between two data lines in a single pixel region. The transparent electrode may overlap with portions of the conductive line or the light shielding element. The light shielding element is for blocking light leakage at the edge of a pixel region and may be made of conductive material or insulating material.

According to another aspect of the present invention, the present invention further provides a pixel structure of a liquid crystal display including a substrate, a first metal layer, a second metal layer, a first insulating layer, a pixel electrode, a second insulating layer and a transparent electrode. The first metal layer is formed on the substrate and includes a conductive line and a light shielding element. The second metal layer is formed on the substrate and includes a first data line formed along the light shielding element, overlapping with portions of the light shielding element and crossing the conductive line; and a second data line substantially parallel to the first data line and crossing the conductive line. The first insulating layer is disposed between the first metal layer and the second metal layer. The pixel electrode overlaps with portions of the second data line and the light shielding element without overlapping with the first data line. The second insulating layer is disposed between the second metal layer and the pixel electrode. The transparent electrode is sandwiched between the substrate and the pixel electrode, is electrically connected to the conductive line and overlaps with portions of the conductive line.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

It should be noticed that, wherever possible, the same reference numbers will be used throughout the drawings to refer to the same or like parts.

Figure 1:
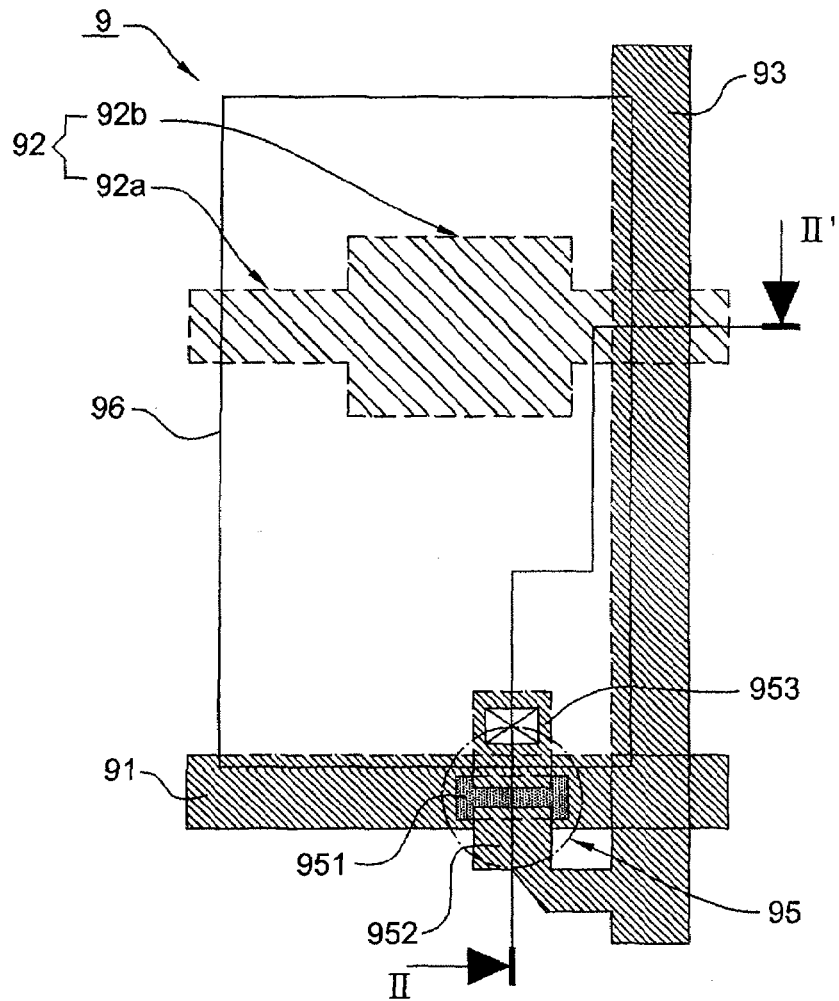
FIG. 1 shows a plane view of a conventional pixel structure of a liquid crystal display.
Figure 2:
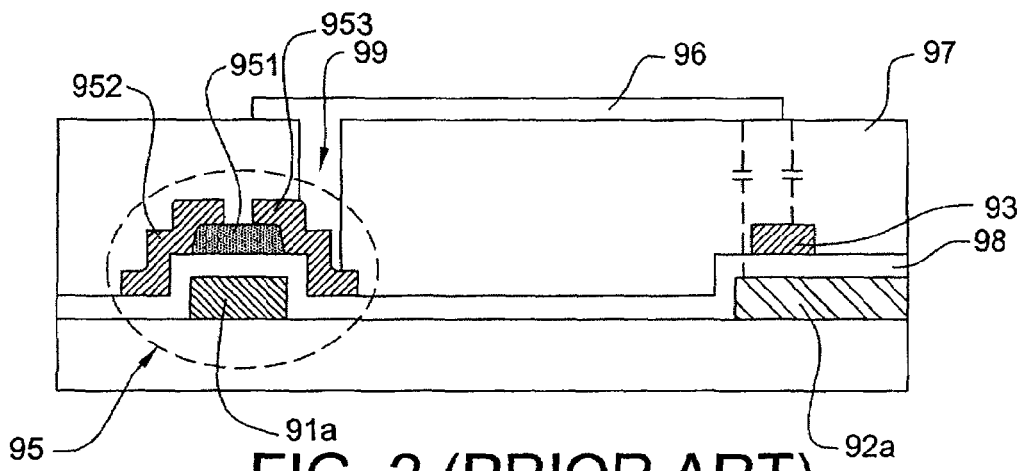
FIG. 2 shows a cross-sectional view taken along the line II-II' of the pixel structure shown in FIG. 1.
Figure 3:
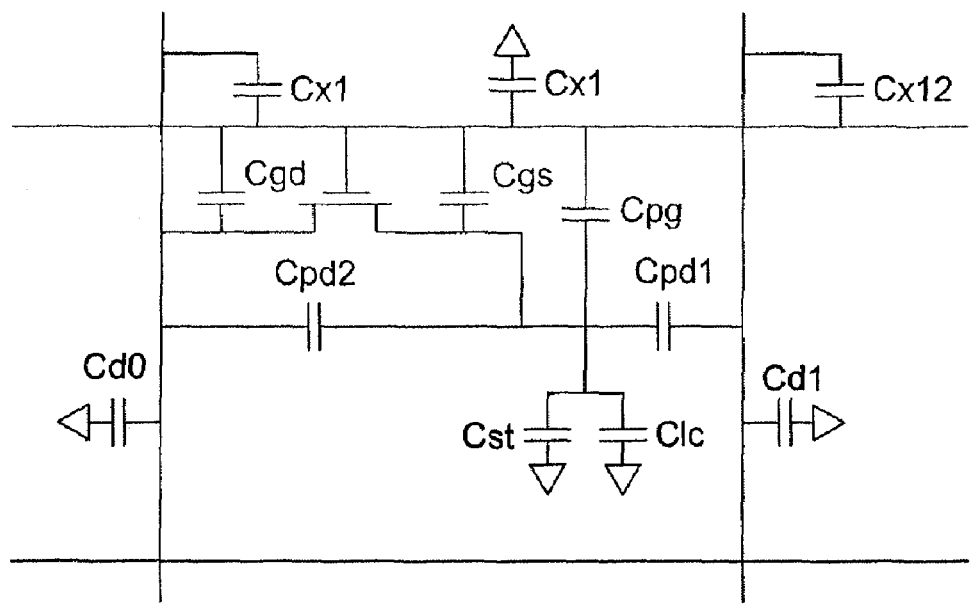
FIG. 3 shows a schematic view of the connection between capacitors in a pixel structure.
Figure 4:
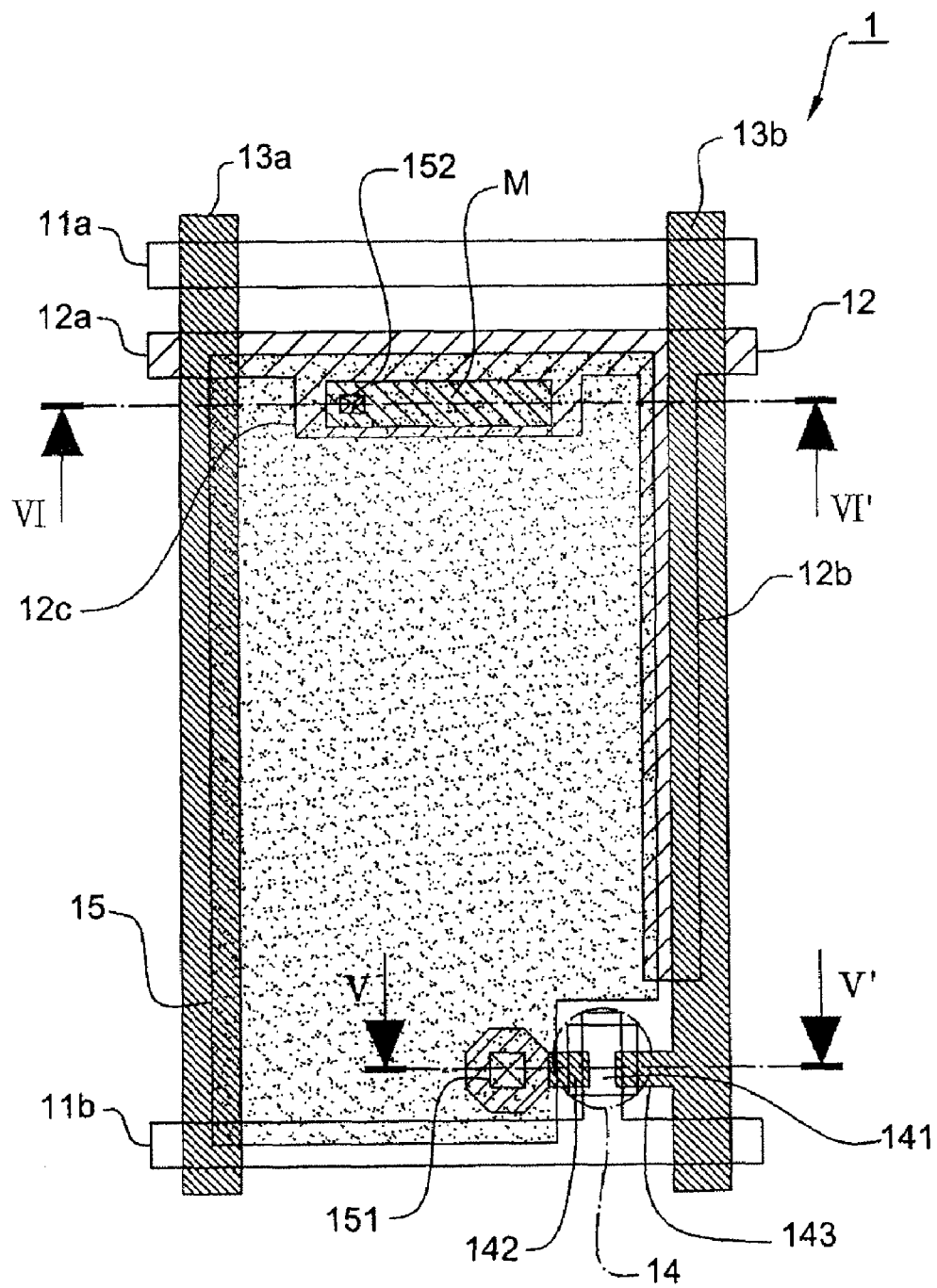
FIG. 4 shows a plane view of the pixel structure of a liquid crystal display according to the first embodiment of the present invention.

Referring to FIG. 4, it shows a plane view of the pixel structure 1 of a liquid crystal display according to the first embodiment of the present invention. The pixel structure 1 includes a first gate line 11a; a second gate line 11b parallel to the first gate line 11a; a conductive line 12 including a first part 12a serving as a common line and a second part 12b serving as a light shielding element and substantially perpendicular to the first part 12a; a first data line 13a and a second data line 13b both perpendicular to the first gate line 11a and the second gate line 11b, wherein the first gate line 11a, the second gate line 11b, the first data line 13a and the second data line 13b together define a pixel region. In addition, in order to increase the storage capacitance (to be illustrated hereinafter), a third part 12c extended toward the central region of the pixel region may be further formed on the first part 12a of the conductive line 12 and a width of the third part 12c is larger than that of the first part 12a. It should be noted that, it is not necessary to implement the third part 12c of the conductive line in the pixel structure 1 of the present invention.

The first gate line 11a and the second gate line 11b are served as scan lines and are patterned by the same photolithography process, and hence the first and second gate lines are referred to first metal layer (M1) herein. Since the first data line 13a and the second data line 13b are patterned by the same photolithography process and after the first metal layer, the first and second data lines are referred to second metal layer (M2) herein. In this embodiment, the conductive line 12 is made of conductive material and the second part 12b thereof is for blocking light leakage at the edge of the pixel structure 1.

A thin film transistor 14 is disposed adjacent to an intersection of the second gate line 11b and the second data line 13b and the thin film transistor 14 includes a gate electrode 141 extended from the second gate line 11b, a source electrode 142 and a drain electrode 143. A pixel electrode 15 is deposited over the pixel region and overlaps with portions of the second gate line 11b, the first data line 13a, the first part 12a of the conductive line 12 and the second part 12b of the conductive line 12 thereby increasing the aperture ratio of the pixel structure 1. In addition, since an overlapping portion of the pixel electrode 15 and the conductive line 12 is served as storage capacitor, it is able to effectively increase the storage capacitance of the pixel structure 1 by overlapping the pixel electrode 15 with the third part 12c of the conductive line 12, and furthermore a conductive layer M can be sandwiched between the third part 12c of the conductive line 12 and the pixel electrode 15. A passivation layer is disposed between the pixel electrode 15 and the conductive layer M and between pixel electrode 15 and the source electrode 142. A first contact hole 151 is provided through the passivation layer such that the pixel electrode 15 can be electrically connected to the source electrode 142, and a second contact hole 152 is also provided through the passivation layer such that the pixel electrode 15 can be electrically connected to the conductive layer M. It should be understood that, the pixel structure 1 further includes other elements not shown in FIG. 4, and those elements will be illustrated in the cross-sectional view of the pixel structure 1 hereinafter. In addition, when the third part 12c of the conductive line 12 is not implemented in the pixel structure 1, the conductive layer M and the second contact hole 152 are not implemented neither.

Figure 5A:
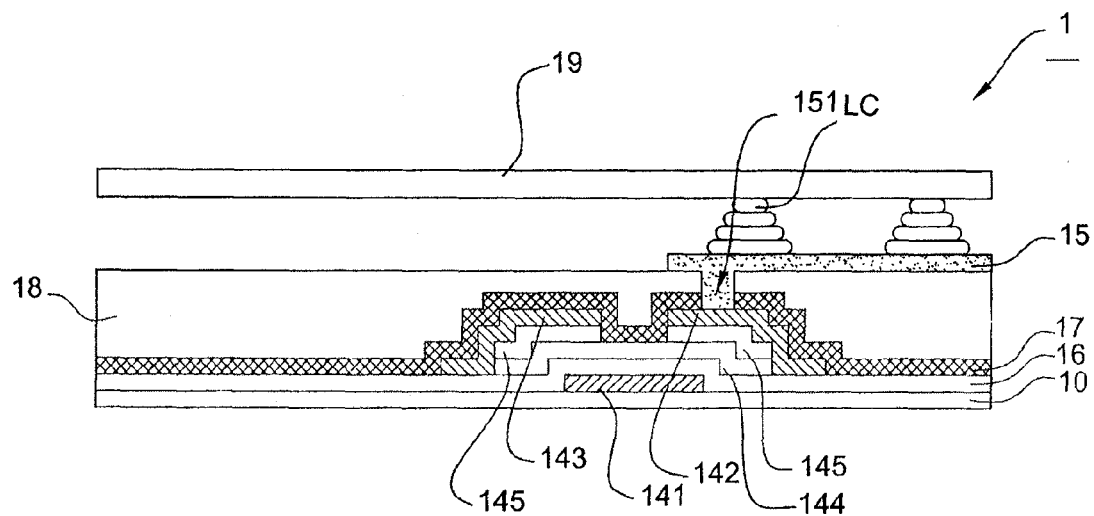
FIG. 5a shows a cross-sectional view taken along the line V-V' of the pixel structure shown in FIG. 4, wherein the pixel structure includes an organic layer.
Figure 5B:
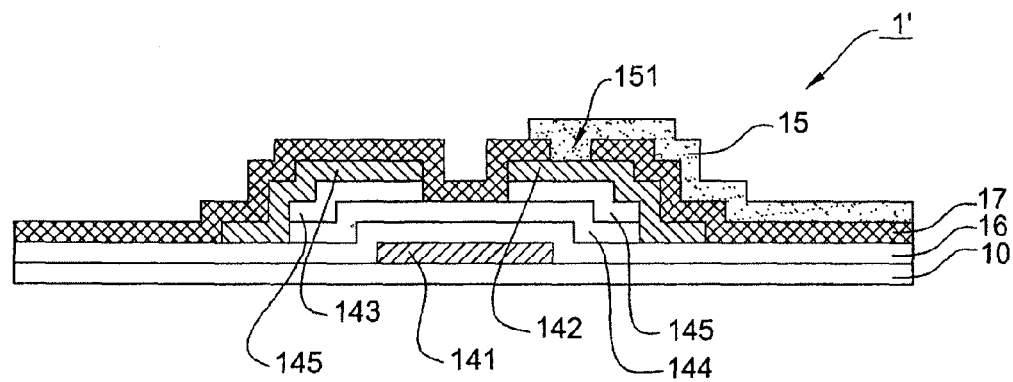
FIG. 5b shows another cross-sectional view taken along the line V-V' of the pixel structure shown in FIG. 4, wherein the pixel structure does not include an organic layer.
Figure 6A:
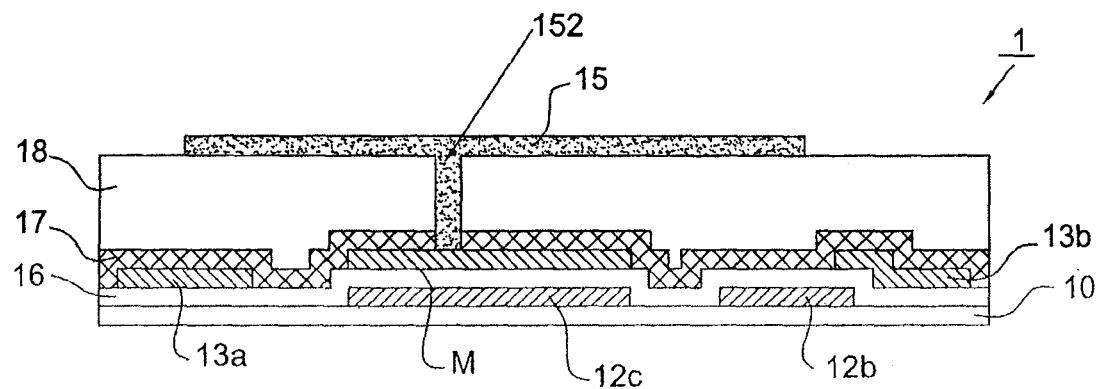
FIG. 6a shows a cross-sectional view taken along the line VI-VI' of the pixel structure shown in FIG. 4, wherein the pixel structure includes an organic layer.
Figure 6B:
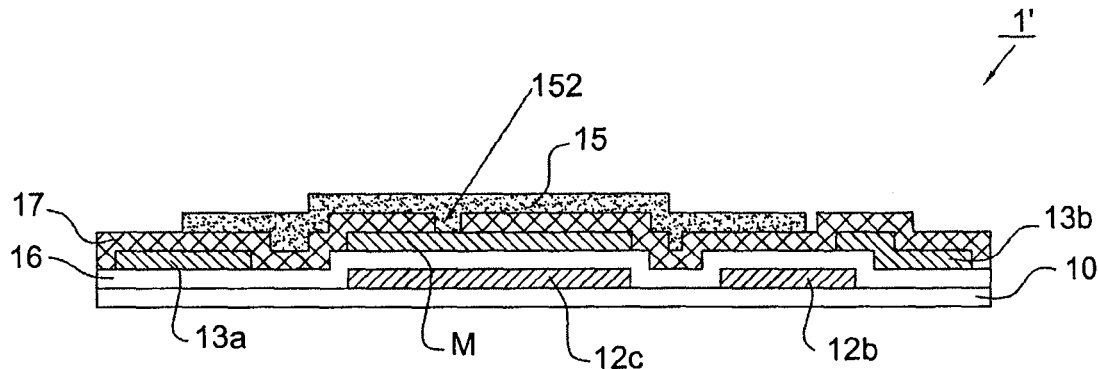
FIG. 6b shows another cross-sectional view taken along the line VI-VI' of the pixel structure shown in FIG. 4, wherein the pixel structure does not include an organic layer.

Referring to FIGS. 5a, 5b, 6a and 6b, FIGS. 5a and 5b show cross-sectional views taken along the line V-V' of the pixel structure 1 shown in FIG. 4 while FIGS. 6a and 6b show cross-sectional views taken along the line VI-VI' of the pixel structure 1 shown in FIG. 4. Please refer to FIGS. 5a and 6a together, they show an example of the pixel structure 1 according to the first embodiment of the present invention having an organic layer and it is a structure of storage capacitor on common (Cst on common).

The pixel structure 1 includes a substrate 10, e.g. a glass substrate. The gate electrode 141, the second part 12b and the third part 12c of the conductive line 12 (first metal layer) are directly formed on the substrate 10. A gate insulating layer 16 is deposited on the substrate 10 to cover the gate electrode 141, the second part 12b and the third part 12c of the conductive line 12. An amorphous silicon layer 144 and a doping layer 145 are successively deposited on the gate insulating layer 16 over the gate electrode 141 and patterned by photolithography processes. A source electrode 142 and a drain electrode 143 are formed respectively on both side portions of the gate electrode 141 in FIG. 5a over the doping layer 145. The first data line 13a, the second data line 13b and the conductive layer M are formed on the gate insulating layer 16 and the second data line 13b overlaps with portions of the second part 12b of the conductive line 12, wherein the source electrode 142, the drain electrode 143, the first data line 13a, the second data line 13b and the conductive layer M are patterned by the same photolithography process (second metal layer). A passivation layer 17 is formed on the gate insulating layer 16 and covers the source electrode 142, the drain electrode 143, the first data line 13a, the second data line 13b and the conductive layer M. An organic layer 18 is formed directly on the passivation layer 17 with a thickness such as 3 micrometers. A pixel electrode 15 is deposited directly on the organic layer 18, overlaps with portions of the first data line 13a and the second part 12b of the conductive line 12 respectively and covers the third part 12c of the conductive line 12, wherein a first contact hole 151 and a second contact hole 152 are provided through the organic layer 18 and the passivation layer 17 such that the pixel electrode 15 can be electrically connected to the source electrode 142 through the first contact hole 151 and the pixel electrode 15 can be electrically connected to the conductive layer M through the second contact hole 152. In addition, the pixel structure 1 further includes an opposite substrate 19 opposite to the substrate 10 and a liquid crystal layer LC sandwiched between the substrate 10 and the opposite substrate 19.

In this embodiment, the material of the passivation layer 17 may be, but not limited to, silicon nitride, silicon oxy-nitride or silicon oxide. The material of the pixel electrode 15 is transparent conductive material, such as, but not limited to, indium tin oxide (ITO), indium zinc oxide (IZO) or aluminum doped zinc oxide (AZO). In this embodiment, the parasitic capacitance between the pixel electrode 15 and data line can be reduced to about half by partially overlapping the pixel electrode 15 with the first data line 13a but without overlapping with the second data line 13b thereby reducing crosstalk; the area of the black matrix (not shown) between two adjacent pixels can be reduced by disposing the second part 12b of the conductive line 12 to block light leakage at the edge of a pixel region thereby increasing the transmission rate of a single pixel structure; the storage capacitance in a single pixel structure can be effectively increased by forming the third part 12c of the conductive line 12.

Please refer to FIGS. 5b and 6b together, they show an example of the pixel structure 1 according to the first embodiment of the present invention without an organic layer. The differences between the pixel structure 1' and the pixel structure 1 shown in FIGS. 5a and 6a are that, the pixel electrode 15 is directly deposited on the passivation layer 17, and a first contact hole 151 is provided through the passivation layer 17 for electrically connecting the pixel electrode 15 to the source electrode 142 of the thin film transistor 14; a second contact hole 152 is provided through the passivation layer 17 for electrically connecting the pixel electrode 15 to the conductive layer M, wherein the thickness of the passivation layer 17 can be increased to between 4500 Å and 9000 Å. In addition, the disposition of other elements is similar to that shown in FIGS. 5a and 6a and details will not be illustrated herein. Since the organic layer 18 needs not to be formed in this example, it is able to simplify the structure and reduce the manufacturing cost. Similarly, the pixel electrode 15 overlaps with portions of the first data line 13a but it does not overlap with the second data line 13b, such that the parasitic capacitance between the pixel electrode 15 and the data line can be reduced to about half, and the coupling ratio in a single pixel region can be reduced by forming the third part 12c of the conductive line 12. In addition, the parasitic capacitance in an overlapping portion of the pixel electrode 15 and the first data line 13a can be further decreased by increasing the thickness of the passivation layer 17 thereby effectively reducing crosstalk.

Figure 7:
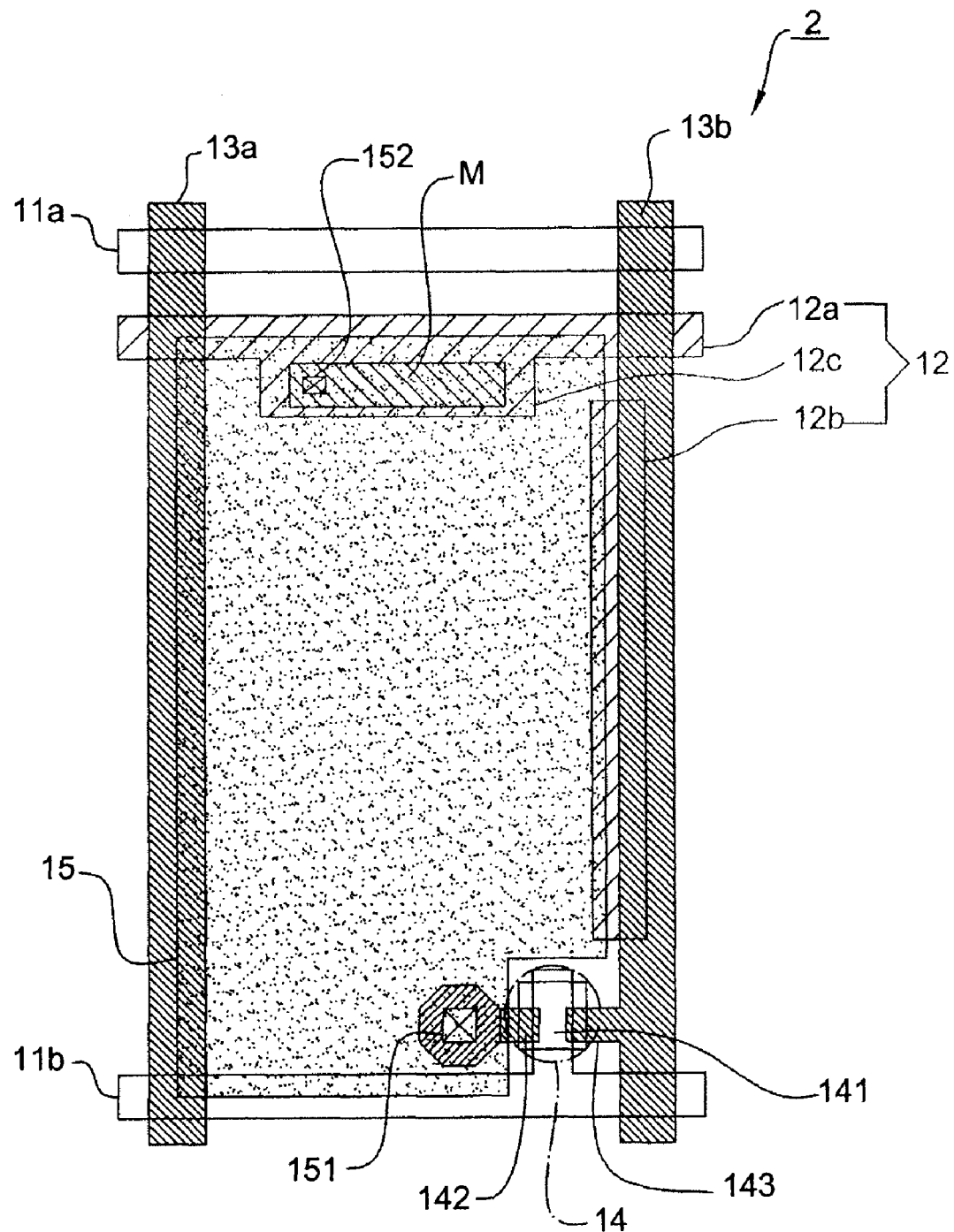
FIG. 7 shows a plane view of the pixel structure of a liquid crystal display according to the second embodiment of the present invention.

Referring to FIG. 7, it shows a plane view of the pixel structure 2 according to the second embodiment of the present invention. The difference between the pixel structure 2 and the first embodiment (shown in FIG. 4) is that, the first part 12a of the conductive line is separated from the second part 12b, i.e. the first part 12a is served as a common line while the second part 12b is served as a light shielding element for blocking light leakage at the edge of a pixel structure and hence the second part 12b can be made of conductive or insulating material. In addition, the deposition of other elements is similar to that shown in FIG. 4 and details will not be illustrated herein. Similarly, the second embodiment of the present invention also includes the example having an organic layer (as those shown in FIGS. 5a and 6a) and the example without an organic layer (as those shown in FIGS. 5b and 6b).

Figure 8:
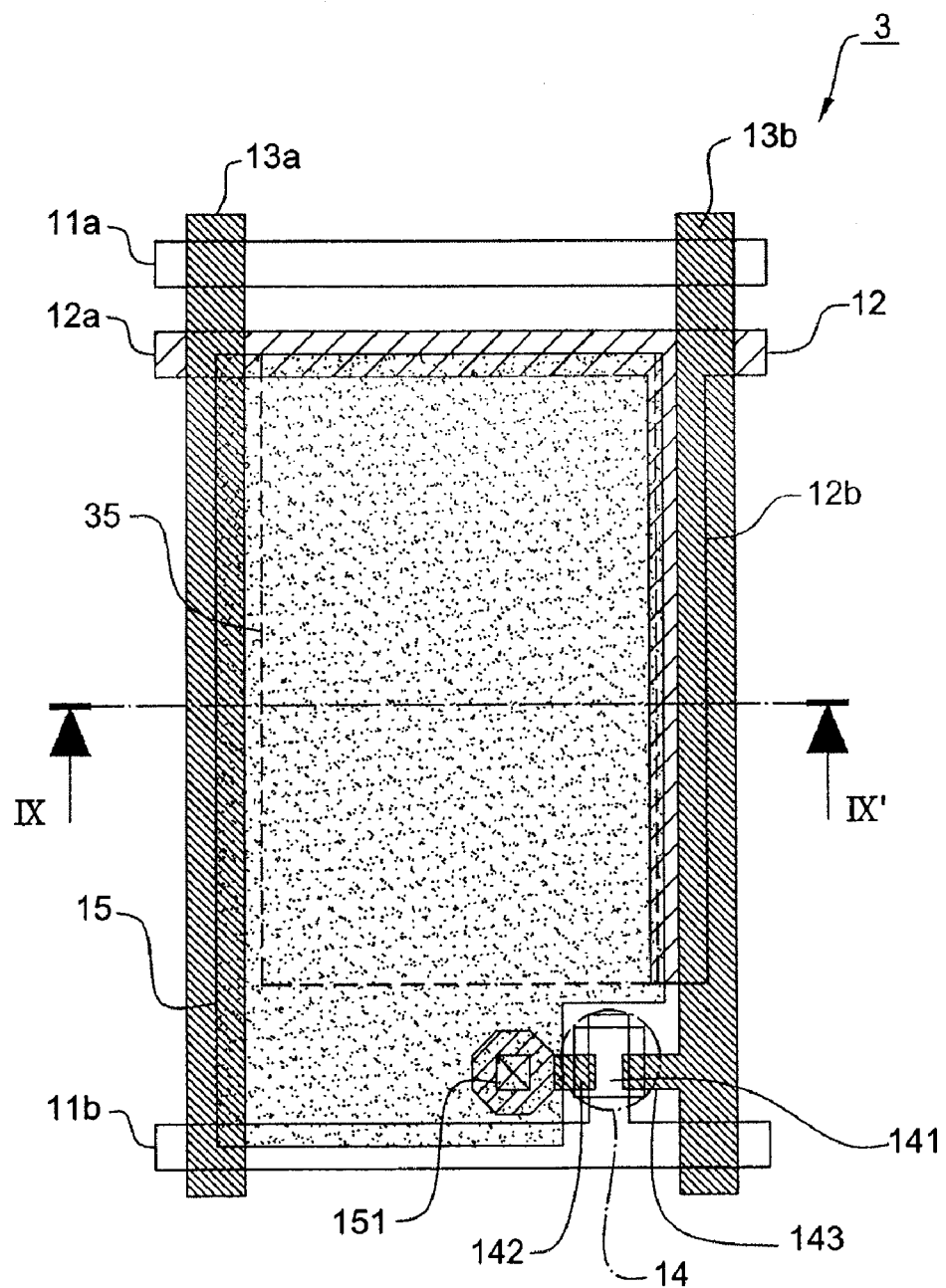
FIG. 8 shows a plane view of the pixel structure of a liquid crystal display according to the third embodiment of the present invention.

Referring to FIG. 8, it shows a plane view of the pixel structure 3 of a liquid crystal display according to the third embodiment of the present invention. The pixel structure 3 includes a first gate line 11a; a second gate line 11b parallel to the first gate line 11a; a conductive line 12 including a first part 12a serving as a common line and a second part 12b serving as a light shielding element and substantially perpendicular to the first part 12a; a first data line 13a and a second data line 13b both perpendicular to the first gate line 11a and the second gate line 11b, wherein the first gate line 11a, the second gate line 11b, the first data line 13a and the second data line 13b together define a pixel region.

A thin film transistor 14 is disposed adjacent to an intersection of the second gate line 11b and the second data line 13b and includes a gate electrode 141 extended from the second gate line 11b, a source electrode 142 and a drain electrode 143. A pixel electrode 15 is deposited over the pixel region and overlaps with portions of the second gate line 11b, the first data line 13a, the first part 12a of the conductive line 12 and the second part 12b of the conductive line 12 thereby increasing the aperture ratio of the pixel structure 3. A first contact hole 151 is provided through the passivation layer 17 such that the pixel electrode 15 can be electrically connected to the source electrode 142. The difference between the third embodiment and the first embodiment is that, a transparent electrode 35 is further deposited within the pixel region to overlap the pixel electrode 15, to overlap with portions of and electrically connect to the first part 12a and the second part 12b of the conductive line 12. The transparent electrode 35 is for forming a storage capacitance in conjunction with the pixel electrode 15, and since the transparent electrode 35 is transparent, it has no influence on the penetration of light. Therefore, by increasing the area of the transparent electrode 35, the storage capacitance between the transparent electrode 35 and the pixel electrode 15 can be increased thereby reducing the coupling ratio in a single pixel region. It should be understood that, the pixel structure 3 further includes other elements not shown in FIG. 8, and those elements will be illustrated in the cross-sectional view of the pixel structure 3 hereinafter. In addition, because the pixel structure 3 includes the transparent electrode 35, the third part 12c of the conductive line 12 may not be implemented as those implemented in the first and the second embodiments.

Figure 9A:
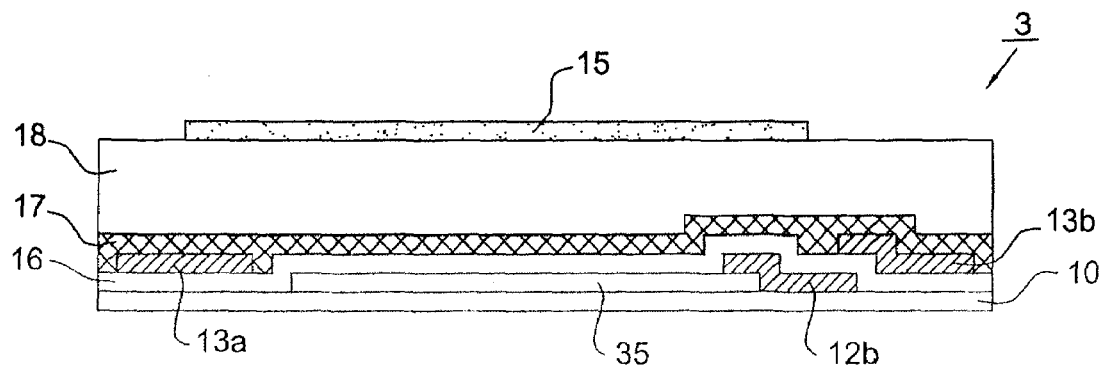
FIG. 9a shows a cross-sectional view taken along the line IX-IX' of the pixel structure shown in FIG. 8, wherein the pixel structure includes an organic layer and the second part of the conductive line is formed after the transparent electrode has been formed.
Figure 9B:
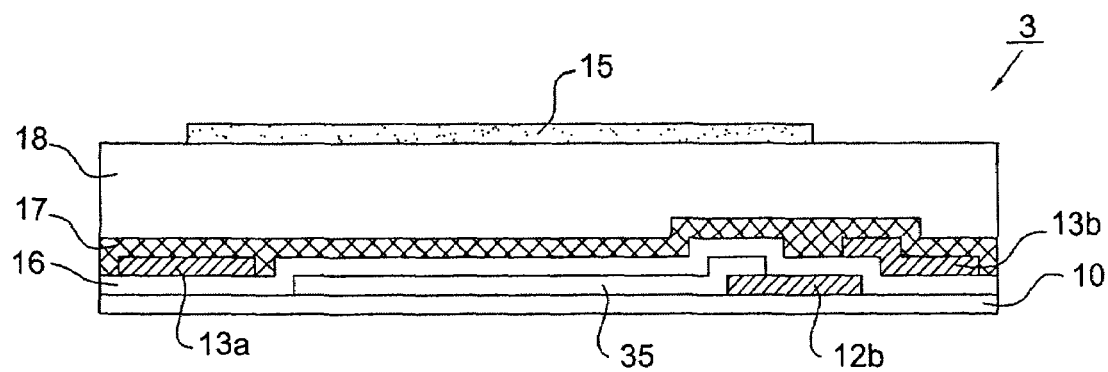
FIG. 9b shows another cross-sectional view taken along the line IX-IX' of the pixel structure shown in FIG. 8, wherein the pixel structure includes an organic layer and the second part of the conductive line is formed before the transparent electrode.
Figure 10A:
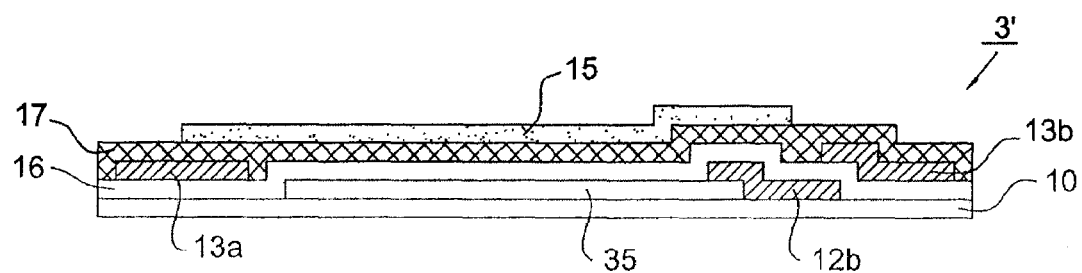
FIG. 10a shows another cross-sectional view taken along the line IX-IX' of the pixel structure shown in FIG. 8, wherein the pixel structure does not include an organic layer and the second part of the conductive line is formed after the transparent electrode has been formed.
Figure 10B:
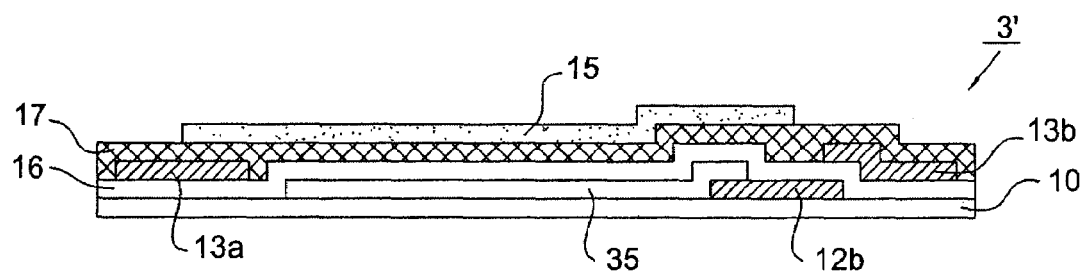
FIG. 10b shows another cross-sectional view taken along the line IX-IX' of the pixel structure shown in FIG. 8, wherein the pixel structure does not include an organic layer and the second part of the conductive line is formed before the transparent electrode.

Referring to FIGS. 9a, 9b, 10a and 10b, they show cross-sectional views taken along the line IX-IX' of the pixel structure 3 shown in FIG. 8. FIGS. 9a and 9b show an example of the pixel structure 3 according to the third embodiment of the present invent having an organic layer 18 while FIGS. 10a and 10b show an example of the pixel structure 3 according to the third embodiment of the present invention without an organic layer and the pixel structures in this embodiment is the structure of storage capacitor on common. It should be understood that, since the transparent electrode 35 does not overlap with the thin film transistor 14, the cross-sectional view of the thin film transistor 14 is similar to that shown in FIGS. 5a and 5b of the first embodiment and details will not be illustrated herein.

Referring to FIG. 9a, it shows an example of the pixel structure 3 according to the third embodiment of the present invention. The pixel structure 3 includes a substrate 10, e.g. a glass substrate. The transparent electrode 35 is directly formed on the substrate 10. The second part 12b of the conductive line 12 is formed on the substrate 10 and overlaps with portions of and electrically connects to the transparent electrode 35. A gate insulating layer 16 is deposited on the substrate 10 and covers the transparent electrode 35 and the second part 12b of the conductive line 12. The first data line 13a and the second data line 13b are formed on the gate insulating layer 16, and the second data line 13b overlaps with portions of the second part 12b of the conductive line 12, wherein the first data line 13a and the second data line 13b are patterned by the same photolithography process (second metal layer). A passivation layer 17 is formed on the gate insulating layer 16 and covers the first data line 13a and the second data line 13b. An organic layer 18 is directly formed on the passivation layer 17 which has a thickness such as 3 micrometers. A pixel electrode 15 is directly deposited over the organic layer 18, overlaps the transparent electrode 35 to form a storage capacitance, and overlaps with portions of the first data line 13a and the second part 12b of the conductive line 12, respectively. It should be understood that, the pixel structure 3 also further includes an opposite substrate opposite to the substrate 10 and a liquid crystal layer sandwiched between the substrate 10 and the opposite substrate although they are not shown in FIG. 9a.

In this embodiment, the material of the passivation layer 17 may be, but not limited to, silicon nitride, silicon oxy-nitride or silicon oxide. The material of the pixel electrode 15 is transparent conductive material, such as, but not limited to, indium tin oxide, indium zinc oxide or aluminum doped zinc oxide.

Referring to FIG. 9b, it shows a second example of the pixel structure 3 according to the third embodiment of the present invention. The differences between FIG. 9b and FIG. 9a are that, the second part 12b of the conductive line 12 is formed on the substrate 10 first, and then the transparent electrode 35 is formed, wherein the transparent electrode 35 overlaps with portions of and electrically connects to the conductive line 12. In addition, the disposition and the material of other elements are similar to those shown in FIG. 9a and details will not be illustrated herein. In the third embodiment, the parasitic capacitance between the pixel electrode 15 and data line can be reduced to about half by partially overlapping the pixel electrode 15 with the first data line 13a but without overlapping with the second data line 13b thereby reducing crosstalk; the area of the black matrix (not shown) between two adjacent pixels can be reduced by disposing the second part 12b of the conductive line 12 to block light leakage at the edge of a pixel region thereby increasing the transmission rate of a single pixel structure; the storage capacitance of a pixel structure can be increased by disposing a transparent electrode 35 overlapping the pixel electrode 15 thereby reducing the coupling ratio in a single pixel region.

Referring to FIGS. 10a and 10b, they show an example of the pixel structure 3 according to the third embodiment of the present invention without an organic layer. The difference between the pixel structure 3' and the pixel structure 3 shown in FIGS. 9a and 9b is that, the pixel electrode 15 is directly deposited on the passivation layer 17 in this example, wherein the thickness of the passivation layer 17 can be increased to between 4500 Å and 9000 Å. In addition, the disposition of other elements in the pixel structure of FIG. 10a is similar to that shown in FIG. 9a while the disposition of other elements in the pixel structure of FIG. 10b is similar to that shown in FIG. 9b, and hence details will not be illustrated herein. In this example, because the organic layer 18 needs not to be formed, it is able to simplify the structure and reduce the manufacturing cost. Similarly, the pixel electrode 15 overlaps with portions of the first data line 13a without overlapping with the second data line 13b, such that the parasitic capacitance between the pixel electrode 15 and data line can be reduced to about half. Moreover, the storage capacitance of a pixel structure can be increased by disposing a transparent electrode 35 overlapping with the pixel electrode 15 thereby reducing the coupling ratio in a single pixel region. The parasitic capacitance in the overlapping portion of the pixel electrode 15 and the first data line 13a can be further decreased by increasing the thickness of the passivation layer 17 thereby effectively reducing crosstalk.

In an alternative embodiment, the first part 12a and the second part 12b of the conductive line 12 in the third embodiment can also be separated from each other, as shown in FIG. 7, i.e. the first part 12a is served as a common line while the second part 12b is served as a light shielding element for blocking light leakage at the edge of a pixel structure and hence the second part 12b can be made of conductive or insulating material. In addition, the disposition and the material of other elements are similar to those shown in FIG. 8 and details will not be illustrated herein. It should be understood that, the pixel structure of which the first part 12a of the conductive line 12 separated from the second part 12b also includes the example having an organic layer (as those shown in FIGS. 9a and 9b) and the example without an organic layer (as those shown in FIGS. 10a and 10b).

Figure 11:
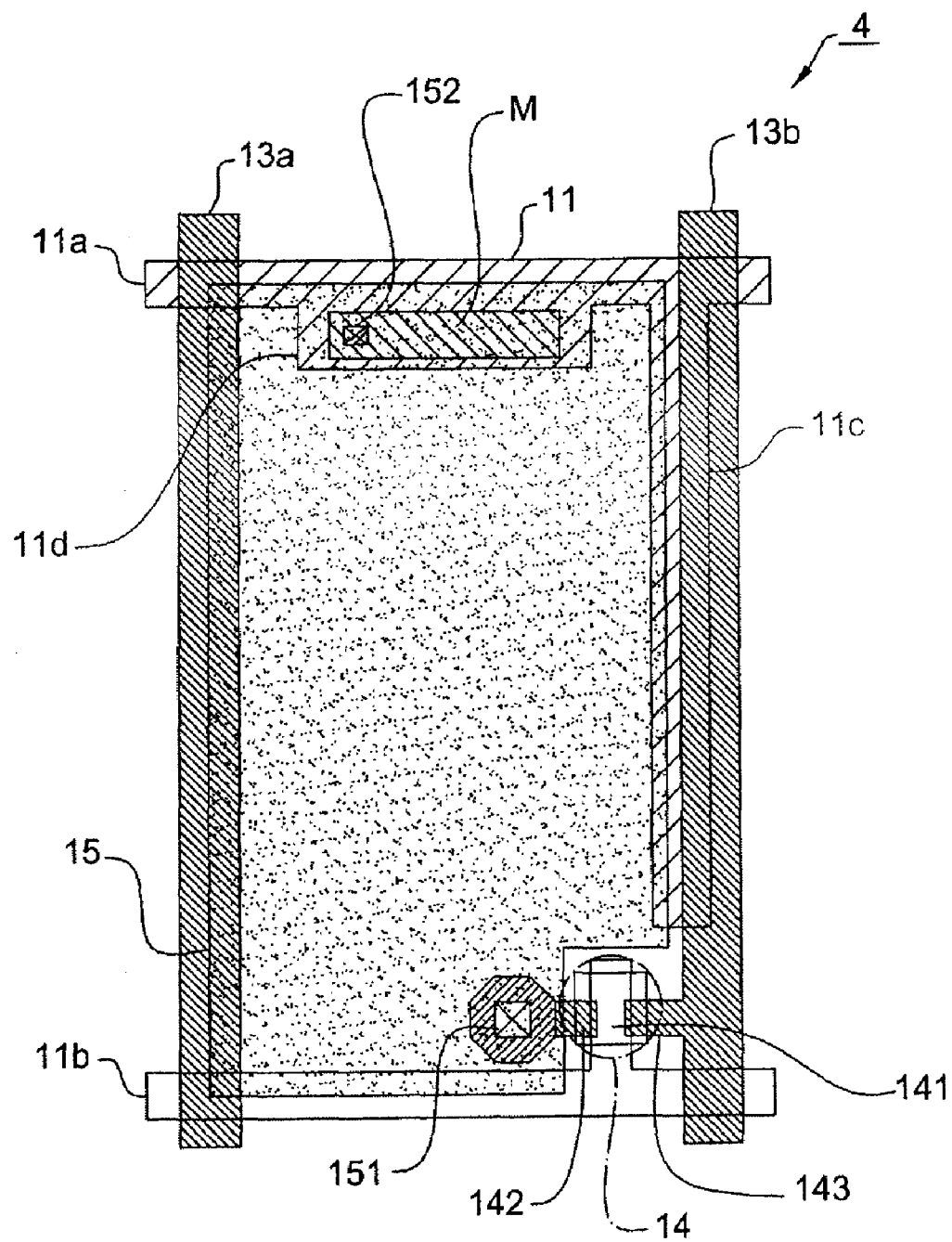
FIG. 11 shows a plane view of the pixel structure of a liquid crystal display according to the fourth embodiment of the present invention.

Referring to FIG. 11, it shows a plane view of the pixel structure 4 of a liquid crystal display according to the fourth embodiment of the present invention. The pixel structure 4 includes a conductive line 11 including a first part 11a serving as a first gate line and a second part 11c serving as a light shielding element and substantially perpendicular to the first part 11a; a second gate line 11b parallel to the first part 11a of the conductive line 11; a first data line 13a and a second data line 13b both perpendicular to the first part 11a (the first gate line) of the conductive line 11 and the second gate line 11b, wherein the first part 11a of the conductive line 11, the second gate line 11b, the first data line 13a and the second data line 13b together define a pixel region. The difference between the fourth embodiment and the first embodiment (FIG. 4) is that, the pixel structure 4 is the structure of storage capacitor on gate (Cst on gate), i.e. the pixel structure 4 does not include a common line. In addition, in order to increase the storage capacitance (to be illustrated hereinafter) of the pixel structure 4, a third part 11d extended toward the central region of the pixel region may be further formed on the first part 11a of the conductive line 11 and a width of the third part 11d is larger than that of the first part 11a. It should be noted that, it is not necessary to implement the third part 11d of the conductive line 11 in the pixel structure 4 of the present invention.

The first part 11a of the conductive line 11 and the second gate line 11b are served as scan lines and since the conductive line 11 and the second gate line 11b are patterned by the same photolithography process, they are referred to first metal layer (M1) herein. Since the first data line 13a and the second data 13b are patterned by the same photolithography process and are formed after the first metal layer has been formed, they are referred to second metal layer (M2) herein. The conductive line 11 is made of conductive material and its second part 11c is for blocking light leakage at the edge of the pixel structure 4.

A thin film transistor 14 is disposed adjacent to an intersection of the second gate line 11b and the second data line 13b and includes a gate electrode 141 extended from the second gate line 11b, a source electrode 142 and a drain electrode 143. A pixel electrode 15 is deposited over the pixel region and overlaps with portions of the second gate line 11b, the first data line 13a, the first part 11a and the second part 11c of the conductive line 11 thereby increasing the aperture ratio of the pixel structure 4. In addition, since the overlapping portion of the pixel electrode 15 and the conductive line 11 is served as storage capacitor, it is able to effectively increase the storage capacitance of the pixel structure 4 by overlapping the pixel electrode 15 with the third part 11d of the conductive line 11, and furthermore a conductive layer M can be sandwiched between the third part 11d of the conductive line 11 and the pixel electrode 15. A first contact hole 151 is provided through the passivation layer 17 such that the pixel electrode 15 can be electrically connected to the source electrode 142, and a second contact hole 152 is provided through the passivation layer 17 such that the pixel electrode 15 can be electrically connected to the conductive layer M. In addition, the disposition and the material of other elements are similar to that of the first embodiment (as shown in FIG. 4) and details will not be illustrated herein. The fourth embodiment of the present invention also includes the example having an organic layer (as those shown in FIGS. 5a and 6a) and the example without an organic layer (as those shown in FIGS. 5b and 6b). It could be understood that, the pixel structure 4 further includes an opposite substrate opposite to the substrate 10 and a liquid crystal layer sandwiched between the substrate 10 and the opposite substrate although they are not shown in FIG. 11. In addition, if the third part 11d of the conductive line 11 is not implemented in the pixel structure 4, the conductive layer M and the second contact hole 152 are not implemented neither.

In the fourth embodiment, the parasitic capacitance between the pixel electrode 15 and data line can be reduced to about half by partially overlapping the pixel electrode 15 with the first data line 13a but without overlapping with the second data line 13b thereby reducing crosstalk; the area of the black matrix (not shown) between two adjacent pixels can be reduced by disposing the second part 11c of the conductive line 11 to block light leakage at the edge of a pixel region thereby increasing the transmission rate of a single pixel structure; the storage capacitance of a single pixel region can be effectively increased by disposing the third part 11d of the conductive line 11.

Figure 12:
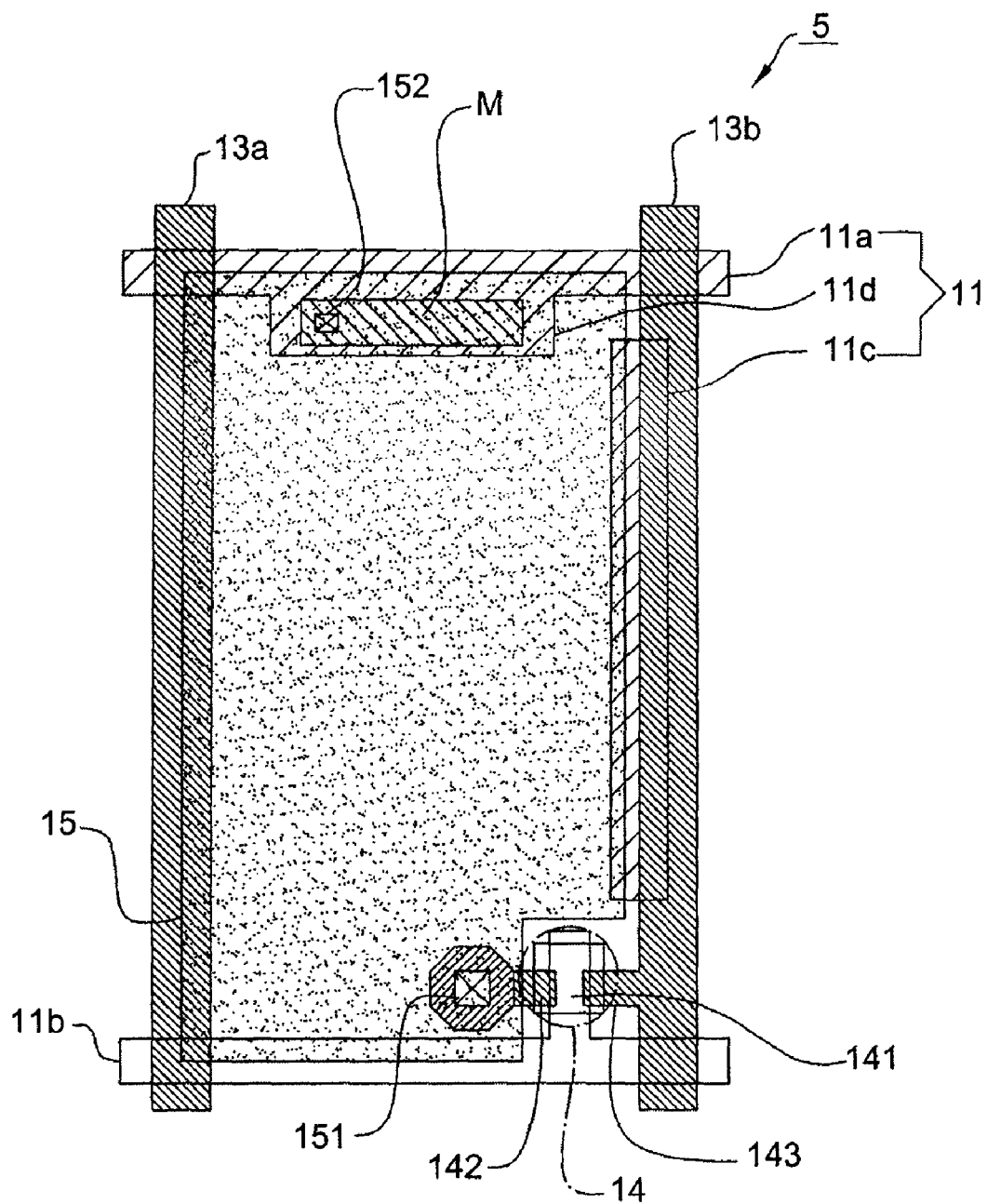
FIG. 12 shows a plane view of the pixel structure of a liquid crystal display according to the fifth embodiment of the present invention.

Referring to FIG. 12, it shows a plane view of the pixel structure 5 according to the fifth embodiment of the present invention, and same reference numbers will be used in FIG. 5 and the pixel structure 4 of FIG. 11 to refer to the same or like parts. The difference between the fifth embodiment and the fourth embodiment is that, the first part 11a of the conductive line 11 is separated from the second part 11c, i.e. the first part 11a is served as a first gate line while the second part 11c is served as a light shielding element for blocking light leakage at the edge of a pixel region and hence the second part 11c can be made of conductive material or insulating material. In addition, the disposition and the material of other elements in the pixel structure 5 are similar to that shown in FIG. 11 and details will not be illustrated herein. It should be understood that, the fifth embodiment of the present invention also includes the example having an organic layer (as those shown in FIGS. 5a and 6a) and the example without an organic layer (as those shown in FIGS. 5b and 6b).

Figure 13:
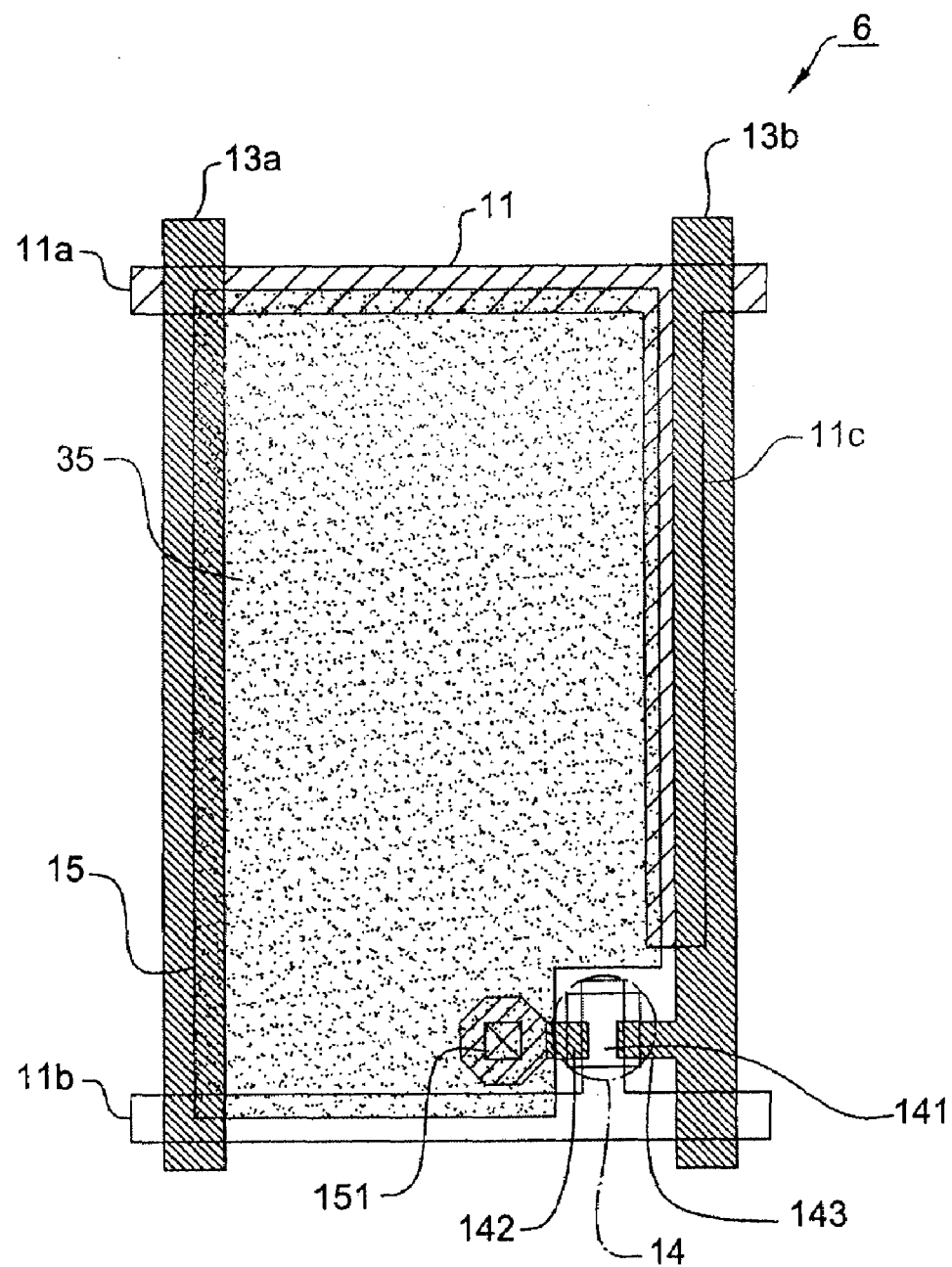
FIG. 13 shows a plane view of the pixel structure of a liquid crystal display according to the sixth embodiment of the present invention.

Referring to FIG. 13, it shows a plane view of the pixel structure 6 of a liquid crystal display according to the sixth embodiment of the present invention. The pixel structure 6 includes a conductive line 11 including a first part 11a serving as a first gate line and a second part 11c serving as a light shielding element and substantially perpendicular to the first part 11a; a second gate line 11b parallel to the first part 11a (the first gate line) of the conductive line 11; a first data line 13a and a second data line both perpendicular to the first part 11a of the conductive line 11 and the second gate line 11b, wherein the first part 11a of the conductive line 11, the second gate line 11b, the first data line 13a and the second data line 13b together define a pixel region. The pixel region 6 of the present embodiment is also the structure of storage capacitor on gate, i.e. the pixel structure 6 does not include a common line.

A thin film transistor 14 is disposed adjacent to an intersection of the second gate line 11b and the second data line 13b and includes a gate electrode 141 extended from the second gate line 11b, a source electrode 142 and a drain electrode 143. A pixel electrode 15 is deposited over the pixel region and overlaps with portions of the second gate line 11b, the first data line 13a, the first part 11a and the second part 11c of the conductive line 11 thereby increasing the aperture ratio of the pixel structure 6. A first contact hole 151 is provided through the passivation layer 17 such that the pixel electrode 15 can be electrically connected to the source electrode 142. The difference between the sixth embodiment and the fourth embodiment is that, a transparent electrode 35 is further deposited within the pixel region to overlap the pixel electrode 15, and to overlap with portions of the first part 11a and the second part 11c of the conductive line 11. The transparent electrode 35 is for forming a storage capacitance with the pixel electrode 15, and since the transparent electrode 35 is transparent, it has no influence on the penetration of light. Therefore, by increasing the area of the transparent electrode 35, the storage capacitance between the transparent electrode 35 and the pixel electrode 15 can be increased thereby reducing the coupling ratio in a single pixel region. In addition, the disposition and the material of other elements are similar to that of the third embodiment (FIG. 8) of the present invention and details will not be illustrated herein. Furthermore, the sixth embodiment of the present invention also includes the example having an organic layer (as those shown in FIGS. 9a and 9b) and the example without an organic layer (as those shown in FIGS. 10a and 10b).

Similarly, in the sixth embodiment, the parasitic capacitance between the pixel electrode 15 and data line can be reduced to about half by partially overlapping the pixel electrode 15 with the first data line 13a but without overlapping with the second data line 13b thereby reducing crosstalk; the area of the black matrix (not shown) between two adjacent pixels can be reduced by disposing the second part 11c of the conductive line 11 to block light leakage at the edge of a pixel region thereby increasing the aperture ratio of a single pixel structure; the storage capacitance of a pixel structure can be increased by disposing a transparent electrode 35 overlapping the pixel electrode 15 thereby further reducing the coupling ratio in a single pixel region. In addition, because the pixel structure 6 of the present embodiment includes the transparent electrode 35, the third part 11d of the conductive line 11 may not be implemented as those implemented in the fourth and the fifth embodiments.

In addition, in the sixth embodiment, the first part 11a of the conductive line 11 can also be separated from the second part 11c, as shown in FIG. 12, i.e. the first part 11a is served as a first gate line while the second part 11c is served as a light shielding element for blocking light leakage at the edge of a pixel region and hence the second part 11c can be made of conductive material or insulating material. In addition, the disposition and the material of other elements are similar to that shown in FIG. 13 and details will not be illustrated herein. It should be understood that, the pixel structure of which the first part 11a of the conductive line 11 separated from the second part 11c also includes the example having an organic layer (as those shown in FIGS. 9a and 9b) and the example without an organic layer (as those shown in FIGS. 10a and 10b).

As shown above, conventionally, the method to reduce the parasitic capacitance by disposing an organic insulating layer has the problem of being unable to effectively reduce the coupling ratio in a single pixel region. In the present invention, the coupling ratio in a single pixel region can be effectively reduced by partially overlapping the pixel electrode with one of two data lines in a pixel region but without overlapping with the other thereby reducing crosstalk. Furthermore, a light shielding element is disposed to block light leakage at the edge of a pixel region such that the area of black matrix between two adjacent pixels can be reduced thereby increasing the transmission rate of a single pixel region.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A pixel structure of a liquid crystal display, comprising:
   a substrate;
   a light shielding element formed on the substrate;
   a metal layer, formed on the substrate and comprising:
     a second data line formed along the light shielding element and overlapping with portions of the light shielding element; and
     a first data line substantially parallel to the second data line; and
   a pixel electrode formed on the substrate and overlapping with portions of the first data line and the light shielding element without overlapping with the second data line; and
   a conductive line crossing the first data line and the second data line, wherein
   the light shielding element is made of conductive material and electrically connected to the conductive line.

2. The pixel structure as claimed in claim 1, wherein a portion of the light shielding element does not overlap with the second data line and the pixel electrode.

3. The pixel structure as claimed in claim 1, further comprising a first insulating layer disposed between the light shielding element and the metal layer.

4. The pixel structure as claimed in claim 1, further comprising an insulating layer disposed between the metal layer and the pixel electrode.

5. The pixel structure as claimed in claim 1, further comprising an organic layer disposed between the pixel electrode and the substrate.

6. The pixel structure as claimed in claim 1, wherein the conductive line is a gate line or a common line.

7. The pixel structure as claimed in claim 1, wherein the pixel electrode overlaps with portions of the conductive line.

8. The pixel structure as claimed in claim 7, further comprising a conductive layer disposed within an overlapping portion of the conductive line and the pixel electrode.

9. The pixel structure as claimed in claim 8, further comprising a first insulating layer disposed between the conductive layer and the conductive line.

10. The pixel structure as claimed in claim 8, further comprising an insulating layer disposed between the conductive layer and the pixel electrode.

11. The pixel structure as claimed in claim 10, further comprising a contact hole provided through the insulating layer such that the conductive layer is electrically connected to the pixel electrode through the contact hole.

12. The pixel structure as claimed in claim 1, further comprising a transparent electrode electrically connected to the conductive line.

13. The pixel structure as claimed in claim 12, wherein the transparent electrode is sandwiched between the substrate and the pixel electrode.

14. The pixel structure as claimed in claim 12, wherein the transparent electrode overlaps with portions of the conductive line.

15. The pixel structure as claimed in claim 12, wherein the transparent electrode overlaps with portions of the light shielding element.

16. The pixel structure as claimed in claim 12, wherein the transparent electrode is disposed between the first data line and the second data line.

17. The pixel structure as claimed in claim 1, further comprising an opposite substrate opposite to the substrate.

18. The pixel structure as claimed in claim 17, further comprising a liquid crystal layer sandwiched between the substrate and the opposite substrate.

19. A pixel structure of a liquid crystal display, comprising:
   a substrate;
   a first metal layer formed on the substrate, the first metal layer comprising:
      a conductive line; and
      a light shielding element electrically connected to the conductive line;
   a second metal layer formed on the substrate, the second metal layer comprising:
      a second data line formed along the light shielding element, overlapping with portions of the light shielding element and crossing the conductive line; and
      a first data line substantially parallel to the second data line and crossing the conductive line;
   a first insulating layer disposed between the first metal layer and the second metal layer;
   a pixel electrode formed on the substrate and overlapping with portions of the first data line and the light shielding element without overlapping with the second data line;
   a second insulating layer disposed between the second metal layer and the pixel electrode; and
   a transparent electrode sandwiched between the substrate and the pixel electrode, electrically connected to the conductive line and overlapping with portions of the conductive line.

20. The pixel structure as claimed in claim 19, wherein the conductive line is a gate line or a common line.

21. The pixel structure as claimed in claim 19, wherein the pixel electrode overlaps with portions of the conductive line.

22. The pixel structure as claimed in claim 19, wherein the transparent electrode does not overlap with the first data line and the second data line.

23. The pixel structure as claimed in claim 19, wherein the second insulating layer is made of an inorganic material.

24. The pixel structure as claimed in claim 23, wherein the pixel electrode is directly disposed on the second insulating layer.

* * * * *